United States Patent [19]
Schneider et al.

[11] Patent Number: 5,406,744
[45] Date of Patent: Apr. 18, 1995

[54] BAIT STATION

[75] Inventors: Brian M. Schneider, Carmel; Anton Arnoldy, Brownsburg; Brian L. Bret, Indianapolis, all of Ind.; Kevin J. Burns, Columbia, S.C.; James E. King, Carmel, Ind.

[73] Assignee: DowElanco, Indianapolis, Ind.

[21] Appl. No.: 192,436

[22] Filed: Feb. 7, 1994

[51] Int. Cl.$^6$ .............................................. A01M 1/20
[52] U.S. Cl. ...................................................... 43/131
[58] Field of Search .................... 43/131, 114, 124, 107, 43/110

[56] References Cited

U.S. PATENT DOCUMENTS

| | | |
|---|---|---|
| 4,044,495 | 8/1977 | Nishimura et al. ..................... 43/114 |
| 4,349,981 | 9/1982 | Sherman ................................. 43/131 |
| 4,648,201 | 3/1987 | Sherman ................................. 43/131 |
| 4,753,032 | 6/1988 | Sherman ................................. 43/131 |
| 4,835,902 | 6/1989 | Sherman ................................. 43/131 |
| 4,837,969 | 6/1989 | Demarest ............................... 43/131 |
| 5,048,225 | 9/1991 | Brandli ................................... 43/131 |

FOREIGN PATENT DOCUMENTS 2111022 9/1972 Germany .............................. 43/131

Primary Examiner—P. Austin Bradley
Assistant Examiner—Chuck Y. Mah
Attorney, Agent, or Firm—Woodard, Emhardt, Naughton, Moriarty & McNett

[57] ABSTRACT

A bait station comprises a base having first and second side walls connected together along a corner and extending preferably at about a 90° angle to one another, and a cover secured to the side walls to form a triangular unit. A pair of mutually-facing, C-shaped projections extend into the interior chamber of the bait station from the corner between the side walls at an angle of 45° to each side wall. (In one embodiment, top projections extend downwardly from the cover adjacent the base projections.) A bait material is positioned in the station between the C-shaped base projections. The bait station is advantageously positioned on a surface adjacent a wall, and insects and the like crawling along the wall are directed into the station and to the bait. The design of the bait station makes it useful with either of the side walls placed as the bottom of the unit.

24 Claims, 5 Drawing Sheets

BAIT STATION

BACKGROUND OF THE INVENTION

1. Field of the Invention

The present invention relates to the field of insect bait stations, and more particularly to devices for administering toxic substances to insects and for guiding insects to the substances while minimizing access by children or domestic animals.

2. Description of the Prior Art

Various types of devices have been known in the prior art for destroying insects. In some devices, the insects are trapped in the device after entering, either by mechanical constructions, or by sticking to a gummy substance. Other devices utilize a poison contained in a bait, which is either contacted or ingested by the insects. It has been a concern that the poisoned bait could be accessed by children or small domestic animals either by direct access to the bait, by destruction of the device, or by inserting probes through openings leading to the bait. There has therefore remained a need for a simple and reliable bait station which prevents such access, while having good effectiveness against insects.

SUMMARY OF THE INVENTION

The present invention provides a bait station which is of simple construction and which addresses the foregoing considerations. The bait station is configured to fit against a wall to facilitate entry by insects, and in a preferred embodiment includes projections which assist in directing insects to the bait in the interior. The bait station contains internal barriers which prevent direct access to the bait from the exterior, and which reduce the potential for destruction of the device by children or small animals.

Briefly describing one aspect of the present invention, there is provided a bait station which has a triangular configuration that is readily positioned in the corner against a wall, with open ends facing along the floor for reception of crawling insects. The station includes first and second side walls joined at about a 90° angle along one edge, either of which may act as the bottom of the station in use, a cover wall secured to and spanning between the free edges of the first and second side walls and defining therewith an interior chamber, and a pair of base projections extending into the interior chamber and defining therebetween a bait area.

It is an object of the present invention to provide a bait station which prevents direct sight of or access to the bait.

A further object of the present invention is to provide a bait station which is configured to promote entry of insects and the like, particularly when placed against a wall.

It is another object of the present invention to provide a bait station which is simple and inexpensive in construction, and yet is resistant to destruction by children or small animals.

Further objects and advantages of the present invention will be apparent from the description of the preferred embodiment which follows.

DESCRIPTION OF THE PREFERRED EMBODIMENT

Figure 1:
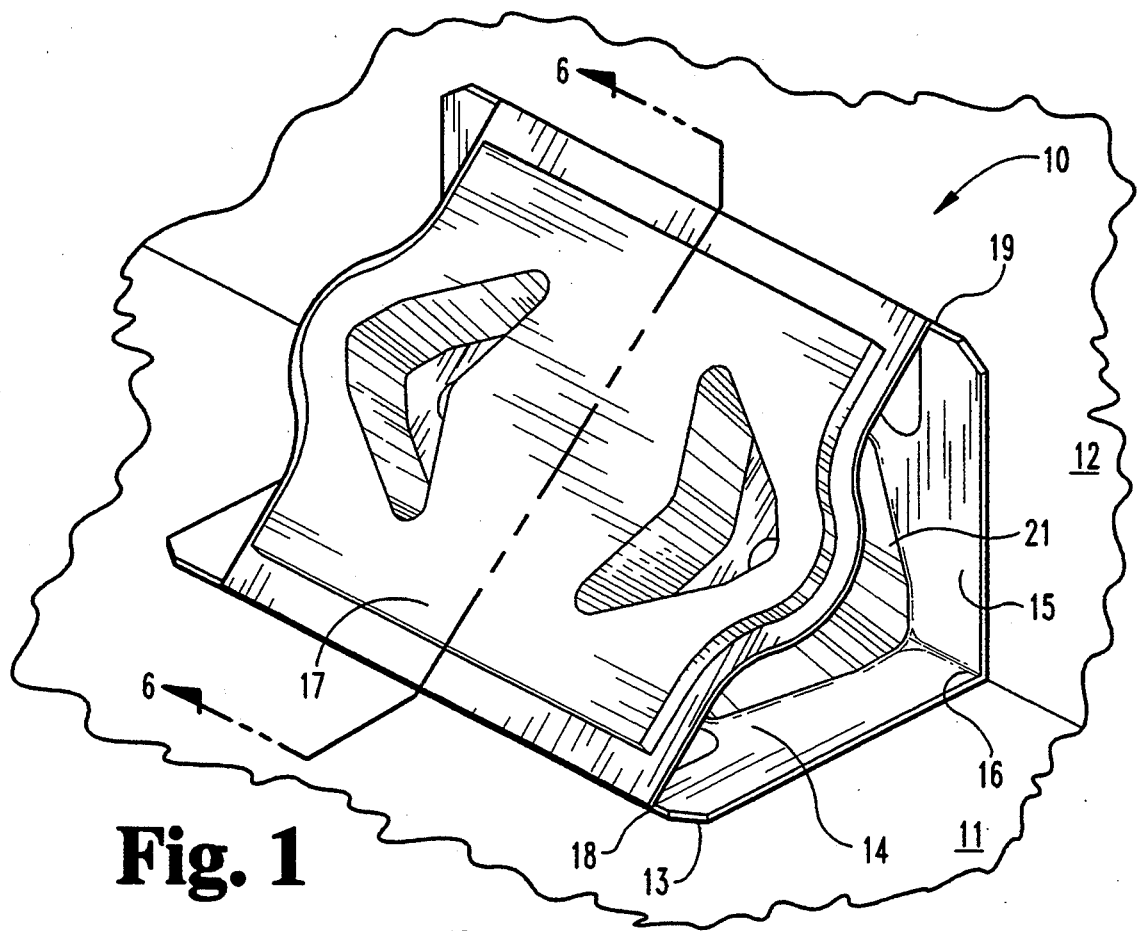
FIG. 1 is a perspective view of a preferred embodiment of the bait station of the present invention shown in position against a wall.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

The present invention provides a bait station which is effective against crawling insects and the like, particularly cockroaches, and which securely retains the bait in a fashion which minimizes access by children or small animals. The station has a generally triangular configuration which facilitates its placement on a floor or other surface against a wall. Insects travelling along the floor surface are directed to the bait in the interior of the station. Barriers extend within the station on opposite sides of the bait area and prevent direct viewing of or access to the bait.

Cockroaches, for example, generally travel along the intersections of wall/floor surfaces and harbor in corners of walls, drawers, and cabinets. Bait stations presently marketed have a flat design which requires that the station entrances be some distance front the intersection of walls, and thus not in the direct path of foraging cockroaches. The present station is triangularly shaped to allow for placement at the intersection of two surfaces, with the entrance holes directly in the path of foraging insects. This placement increases the probability of cockroaches, etc. entering the station containing the bait. Also, the station is inconspicuous, and can be placed anywhere along the intersection of two surfaces, including in corners. The interior design allows for insects to easily access the bait, yet restricts human contact and protects the bait from contaminants.

Referring in particular to the drawings, there is shown a bait station 10 constructed in accordance with a preferred embodiment of the present invention. The bait station 10 has a generally triangular configuration to fit upon a surface 11 closely adjacent a wall 12. The station includes a base 13 having first and second, substantially rectangular side walls 14 and 15. The side walls are joined along an edge 16 and for simplicity and strength are preferably integral with one another.

One feature of the present invention is that it may be closely placed in the intersection of a horizontal surface and upstanding wall. Therefore, the side walls preferably extend at a substantially 90° angle to each other. It will be appreciated, however, that the angle between the two side walls is not critical, and variations in such angle may be desired for use in areas in which the adjoining horizontal and vertical surfaces are at an angle other than 90°. Therefore, the corner angle for the bait station may be adapted to a particular use situation. For purposes of definition, it is contemplated that an angle of substantially 90° encompasses angles ranging from 70° to 110°.

As will be evident, the bait station is configured so that it may be positioned with either side wall operating as the bottom. In conventional fashion, double-sided tape or other fastening means may be provided on the exteriors of the side walls to secure the bait station in place. A cover wall 17 is secured to and spans between the free edges 18 and 19 of the side walls, completing the triangular shape of the station and defining with the side walls an interior chamber for reception of the bait material.

Figure 2:
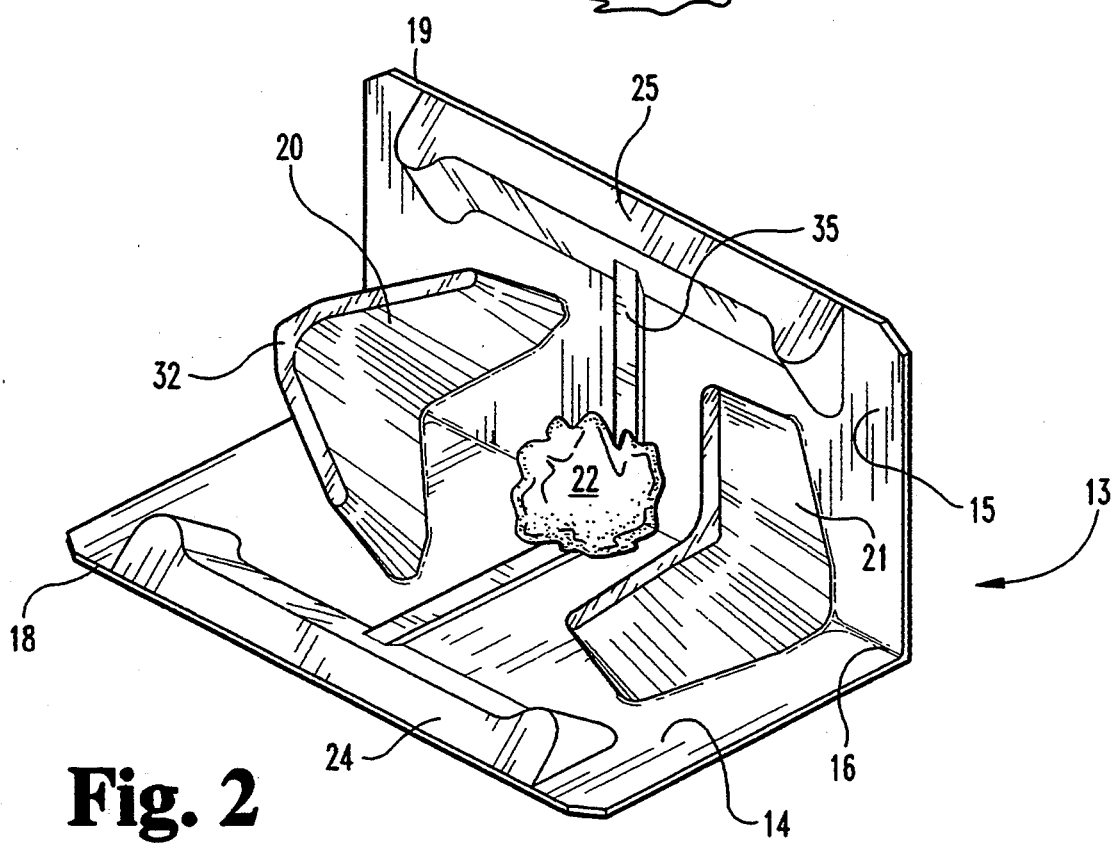
FIG. 2 is a perspective view of the base used in the bait station of FIG. 1.
Figure 3:
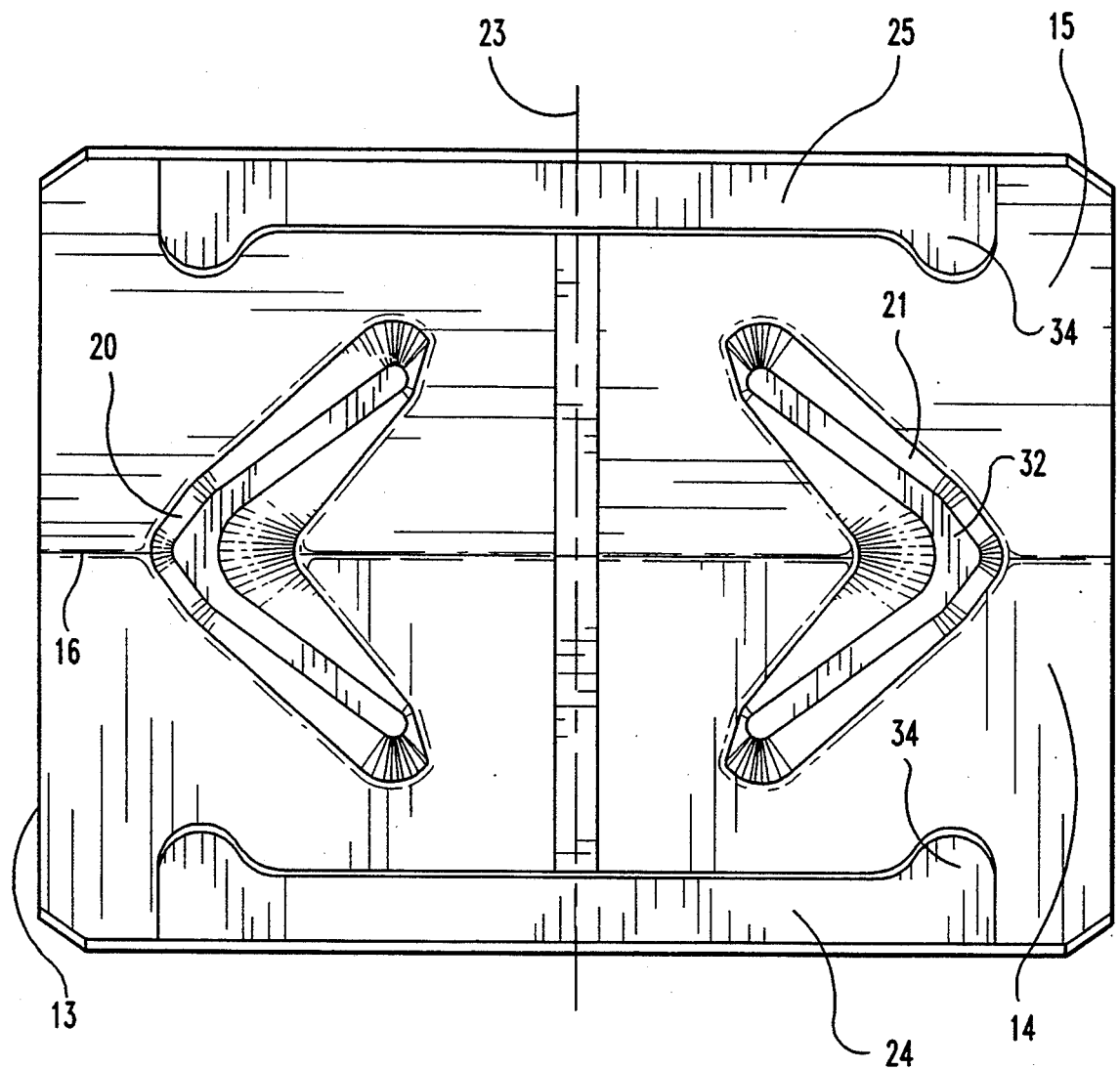
FIG. 3 is a plan view of the base of FIG. 2 viewing directly down at the base projections.

A pair of base projections 20 and 21 (FIG. 2) extend into the interior chamber and define therebetween a bait area containing bait 22. An advantage is obtained by providing base projections which are mirror images of each other about a transverse axis 23. Similarly, an advantage is obtained by having the base projections extend symmetrically from both side walls. In this fashion, the base is completely reversible, and either side wall 14 or 15 can be used as the bottom of the bait station.

The base projections may assume a variety of shapes and positions, provided that certain functions are accomplished. It is a primary purpose of the base projections to prevent line-of-sight access to the bait area from the exterior of the bait station. The projections therefore extend outwardly from the edge 16 a sufficient distance, and in a preferred embodiment cooperate with sealing shoulders 25 and 24, to accomplish this purpose.

The base projections also are preferably configured to assist in directing insects crawling along a wall to the interior of the bait station. It is therefore desirable to have the projections angled inwardly of the bait station in the direction away from the corner edge 16. Insects approaching the bait station from the exterior are thereby directed into the interior, rather than being blocked and turned away from the station. Again, the projections cooperate with the sealing shoulders in this respect for a preferred embodiment of the station.

The foregoing and other purposes are particularly well satisfied by providing mutually-facing, generally C-shaped projections. Further, it is particularly desirable for the C-shaped projections to extend from the corner formed by the two side walls in a direction generally 45° to each side wall. In a fashion as previously noted, this design feature makes the base completely reversible, making it irrelevant which side wall is placed down as the bottom of the bait station. In addition, this configuration for the C-shaped projections accomplishes the foregoing purposes of defining the bait area without line-of-sight access, and directing insects and the like toward the interior chamber and bait area of the station.

The bait station includes a bait 22 positioned between the upstanding base projections. The particular "bait" used is not critical to the invention. It may, for example, comprise a mixture of a slow acting poison and a food material attractive to insects, such as flour, molasses, peanut butter or the like. The bait is preferably of a paste-like or solid consistency, and is secured to the station to prevent it from being dislodged and removed from the station, as by shaking the station. A preferred bait has a consistency that allows it to stick in the station as it hardens soon after injection.

Figure 4:
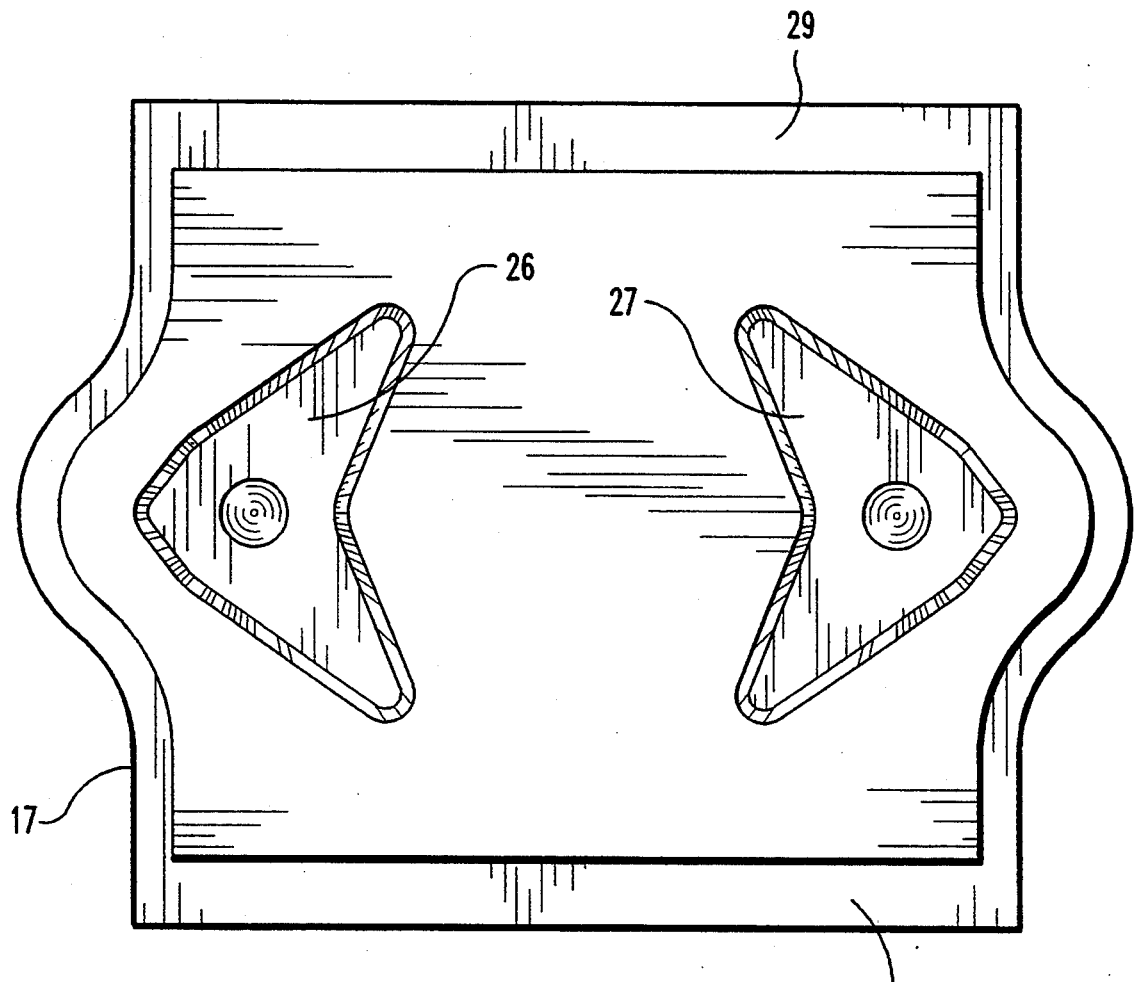
FIG. 4 is a top, plan view of the cover used in the bait station of FIG. 1.
Figure 5:
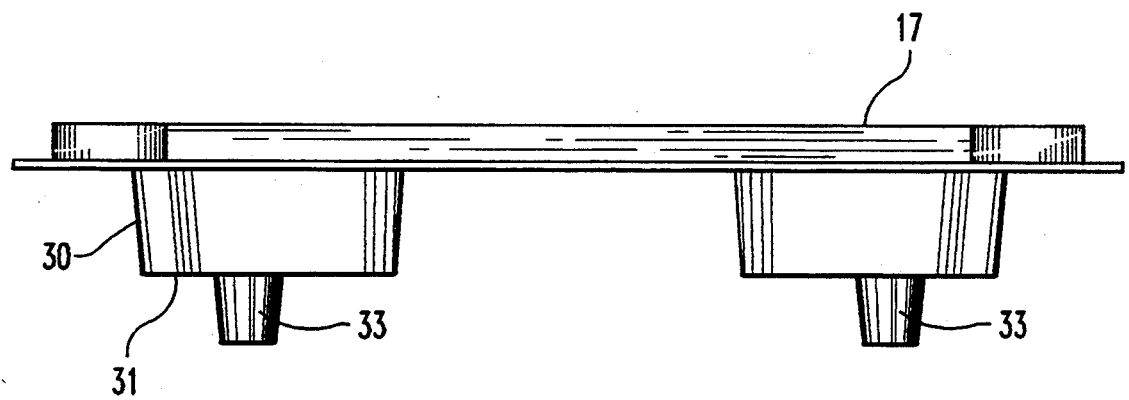
FIG. 5 is a side, elevational view of the cover of FIG. 4.

A preferred embodiment for the cover 17 is shown in FIGS. 4 and 5. As shown in FIG. 4, the cover has a generally rectangular shape with a pair of top projections 26 and 27. The cover includes sides 28 and 29 which are secured to the edges 18 and 19 of the base. More particularly, the base walls include sealing shoulders 24 and 25 which provide flat surfaces abutting the sides 28 and 29, respectively, to facilitate securement of the cover to the base.

The top projections 26 and 27 extend downwardly from the cover and into the interior chamber in opposition to the base projections of the bait station. The top projections cooperate with the base projections to provide a sturdy bait station and to minimize accessibility of the bait. The top projections preferably extend at least down to the base projections, and more preferably overlap with the base projections. Although not necessary, the top projections may be secured to the base projections to provide an even more secure station. As an alternative, it will be appreciated that the same function is accomplished by simply extending the base projections all the way to the cover, eliminating the need for separate top projections.

Figure 6:
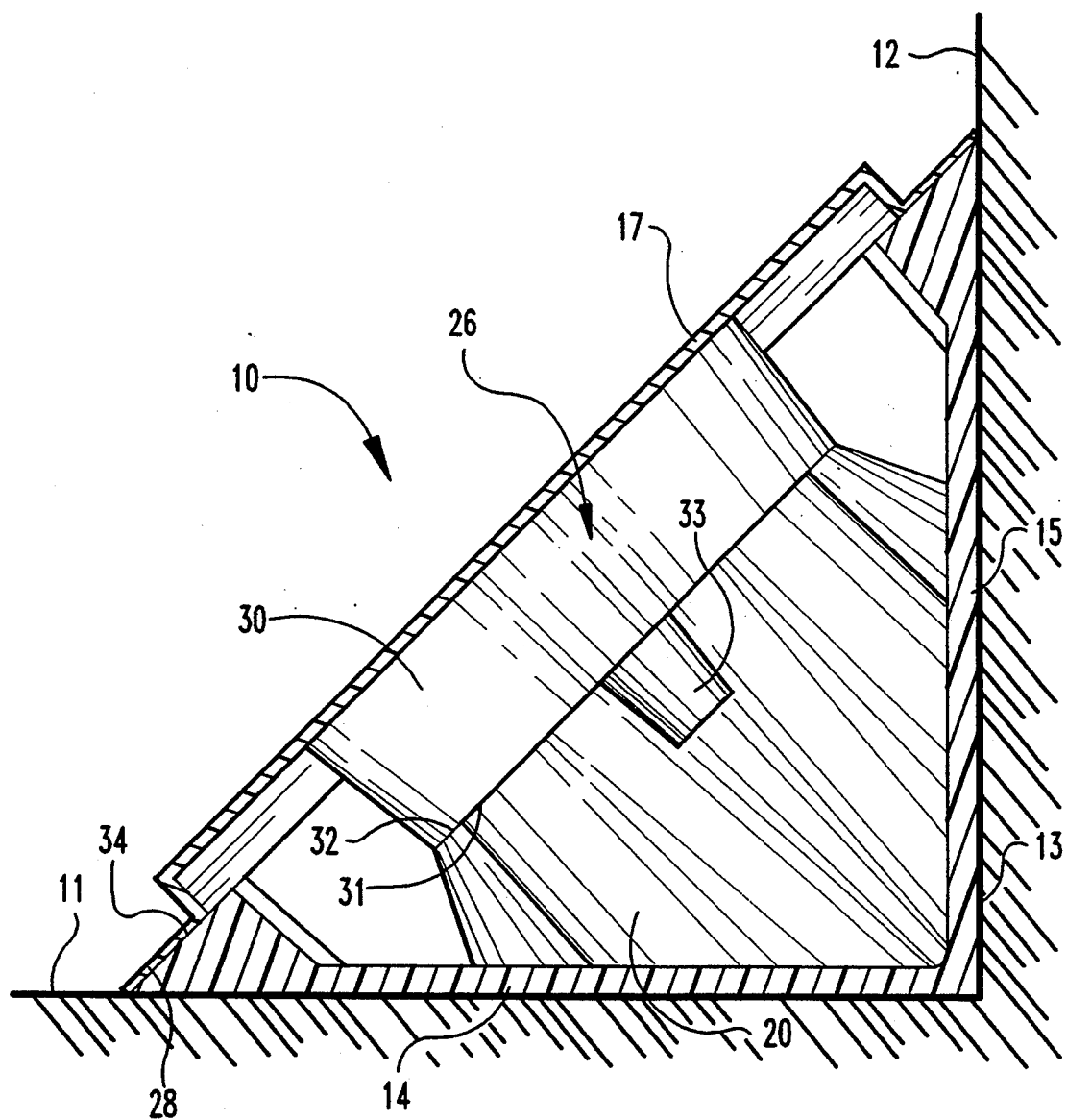
FIG. 6 is an end, cross-sectional view of the bait station of FIG. 1 taken along the line 6—6.
Figure 7:
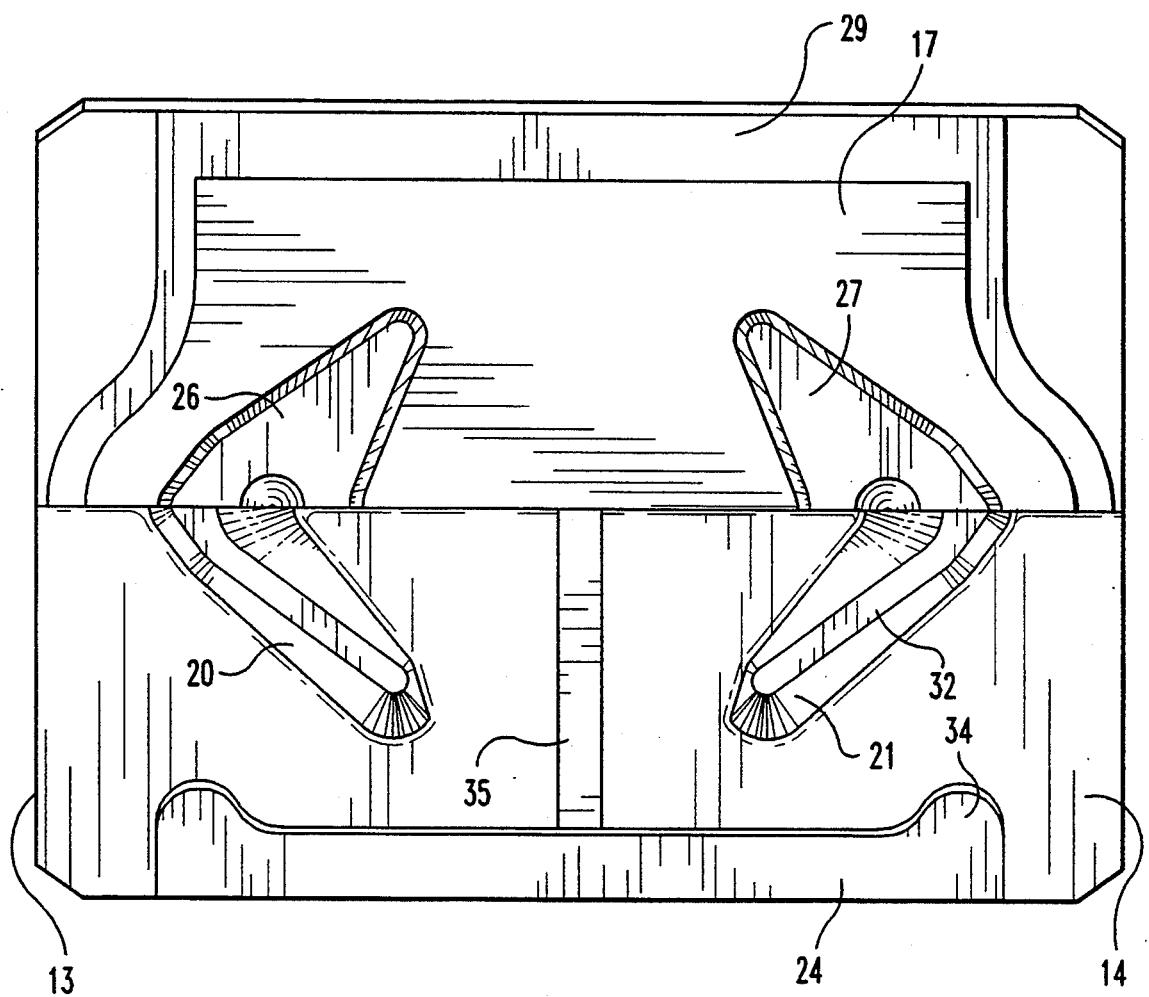
FIG. 7 is a plan view of the assembled bait station of FIG. 1, viewing directly down on the cover and showing a portion of the cover broken away.

As shown in the drawings, the top projections may include first portions 30 which complement and extend adjacent to the opposed base projections, and second portions 33 which are received within the C-shaped base projections. In particular, the first portion, such as 30, includes a surface 31 which rests against the top surface 32 of the base projection 20 (FIG. 6). The second portion 33 is sized to be received within the C-shaped base projection 20. This relationship of the top and bottom projections provides an overlap which prevents any type of probe being readily inserted between the projections. Securing together the respective top and bottom projections, such as by gluing or heat sealing, would further enhance this aspect of the station. In addition, the top projections are preferably configured as mirror images of each other about the transverse axis 23 (when assembled with the base), and contribute again to the reversibility of the cover relative to the base, and of the overall bait station, in use.

The bait station shown in the drawings also incorporates several features which enhance the durability of the bait station. The sealing shoulders 24 and 25 provide longitudinal bracing for the side walls. In a preferred embodiment the cover is secured to the base along these sealing shoulders by heat welding, although other means such as adhesives or sonic welding may be used. The ends 34 of the sealing shoulders are enlarged to provide additional reinforcement for the side walls, and to act with the base projections to define an entry into the bait station for crawling insects. The base and top projections provide support for the central portion of the bait station. In addition, lateral supports, such as 35, are provided running transverse to the side walls to provide additional strength for the unit.

The bait station of the present invention may be readily and inexpensively constructed from a variety of materials as is well known in the art. For example, plastics such as polyvinyl chloride, polypropylene or polystyrene are well suited for this purpose. The bait station may therefore be readily and inexpensively formed from deformable materials, such as plastics, by well know thermoforming, vacuum forming or injection molding methods.

The preferred design of the bait station, particularly the use of base projections which extend from tile corner of the base at 45° angles to each side wall, enables the base and cover to be conveniently molded from plastic materials. The base and cover maybe formed as unitary pieces. One method for forming the base is from a flat sheet of plastic which is either thermoformed or vacuum formed over a suitably designed mold to form the projections, etc. It is also possible to form the base by injection molding a molten plastic into a suitably designed mold.

The sealing shoulders, top and base projections, and lateral supports contribute to the overall rigidity and durability of a station so produced. The use of molding results in the base projections and other components of the base, as well as those of the cover, to be formed integral with one another, further contributing to the simplicity of the construction and strength of the design.

It will be appreciated that the present invention provides an insect feeding station for administering poisons to insects, particularly crawling insects such as cockroaches and ants. The bait station has means to guide the insects to the poisoned bait as well as entry baffles so that children cannot probe the bait containing compartment.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A bait station, comprising:
    first and second side walls, each of said side walls having opposed first and second edges, the first edges being joined together along a line of intersection to form a corner between said side walls;
    a cover wall secured to and spanning between the second edges of said first and second side walls and defining with said side walls an elongated, open-ended, triangular member having an interior chamber; and
    a pair of base projections extending from both of said side walls into the interior chamber and defining therebetween a bait area.

2. The bait station of claim 1 in which said pair of base projections are mirror images of each other about a transverse axis of said side walls extending orthogonally to the line of intersection of the first edges.

3. The bait station of claim 1 in which said base projections comprise mutually-facing, generally C-shaped projections.

4. The bait station of claim 3 in which said pair of base projections are mirror images of each other about a transverse axis of said side walls extending orthogonally to the line of intersection of the first edges.

5. The bait station of claim 1 in which said pair of base projections extend from the corner between said side walls.

6. The bait station of claim 5 in which said pair of base projections extend at an angle of about 45° to each of said side walls.

7. The bait station of claim 6 in which said pair of base projections are mirror images of each other about a transverse axis of said side walls extending orthogonally to the line of intersection of the first edges.

8. The bait station of claim 6 in which said base projections comprise mutually-facing, generally C-shaped projections.

9. The bait station of claim 6 in which said pair of base projections are formed integrally with said side walls.

10. The bait station of claim 9 in which said side walls and said pair of base projections comprise a molded plastic.

11. A bait station, comprising:
    first and second side walls, each of said side walls having opposed first and second edges, the first edges being joined together along a line of intersection to form a corner between said side walls;
    a cover wall secured to and spanning between the second edges of said first and second side walls and defining with said side walls an elongated, open-ended, triangular member having an interior chamber; and
    a pair of base projections extending from at least one of said side walls into the interior chamber and defining therebetween a bait area;
    wherein said base projections extend adjacent to said cover wall, and wherein said base projections are secured to said cover wall.

12. A bait station, comprising:
    first and second side walls, each of said side walls having opposed first and second edges, the first edges being joined together along a line of intersection to form a corner between said side walls;
    a cover wall secured to and spanning between the second edges of said first and second side walls and defining with said side walls an elongated, open-ended, triangular member having an interior chamber; and
    a pair of base projections extending from at least one of said side walls into the interior chamber and defining therebetween a bait area;
    wherein said cover wall includes a pair of top projections extending into the interior chamber and in opposition to the base projections.

13. The bait station of claim 12 in which the top projections are mirror images of each other about a transverse axis of said side walls extending orthogonally to the line of intersection of the first edges.

14. The bait station of claim 12 in which the top projections extend adjacent said base projections.

15. The bait station of claim 14 in which the top projections are secured to said base projections.

16. The bait station of claim 14 in which the top projections extend sufficiently to overlap with said base projections.

17. The bait station of claim 16 in which the top projections are secured to said base projections.

18. The bait station of claim 16 in which said base projections comprise mutually-facing, generally C-shaped base projections and the top projections are received within the C-shaped base projections.

19. The bait station of claim 18 in which the top projections are secured to said base projections.

20. The bait station of claim 12 in which said pair of base projections extend from the corner between said side walls.

21. The bait station of claim 20 in which said pair of base projections extend at an angle of about 45° to each of said side walls.

22. The bait station of claim 21 in which said base projections comprise mutually-facing, generally C-shaped base projections and the top projections are received within the C-shaped base projections.

23. A bait station which comprises:
- an elongated, open-ended, triangular housing including first and second side walls and a cover, each of the first and second side walls having opposed first and second edges, the first edges being joined together along a line of intersection to form a corner between the side walls, the cover being secured to and spanning between the second edges of the first and second side walls and defining with the side walls an interior chamber; and
- a pair of projections extending from at least one of the side walls and from the cover into the interior chamber and defining therebetween a bait area.

24. The bait station of claim 23 in which the first side wall is at angle of substantially 90° to the second side wall.

* * * * *